US011840943B2

(12) United States Patent
Conlon

(10) Patent No.: US 11,840,943 B2
(45) Date of Patent: Dec. 12, 2023

(54) FLEXIBLE INTEGRATION OF STORED HEAT AND ELECTRIC RESOURCES (FISHER)

(71) Applicant: PINTAIL POWER LLC, Palo Alto, CA (US)

(72) Inventor: William M. Conlon, Palo Alto, CA (US)

(73) Assignee: Pintail Power LLC, Palo Alto, CA (US)

( * ) Notice: Subject to any disclaimer, the term of this patent is extended or adjusted under 35 U.S.C. 154(b) by 0 days.

(21) Appl. No.: 17/871,600

(22) Filed: Jul. 22, 2022

(65) Prior Publication Data

US 2022/0356819 A1  Nov. 10, 2022

Related U.S. Application Data

(63) Continuation of application No. PCT/US2021/017275, filed on Feb. 9, 2021.

(60) Provisional application No. 63/043,699, filed on Jun. 24, 2020, provisional application No. 62/986,210, filed on Mar. 6, 2020, provisional application No. 62/972,278, filed on Feb. 10, 2020.

(51) Int. Cl.
| | |
|---|---|
| *F01K 23/10* | (2006.01) |
| *F01K 23/06* | (2006.01) |
| *F02G 5/02* | (2006.01) |
| *F01K 3/12* | (2006.01) |
| *F01K 3/18* | (2006.01) |
| *F01K 25/00* | (2006.01) |

(52) U.S. Cl.
CPC ............... *F01K 23/10* (2013.01); *F01K 3/12* (2013.01); *F01K 3/186* (2013.01); *F01K 23/065* (2013.01); *F01K 25/00* (2013.01); *F02G 5/02* (2013.01)

(58) Field of Classification Search
CPC .......... F01K 3/12; F01K 23/10; F01K 23/065; F01K 3/186; F01K 25/00; F02G 5/02
See application file for complete search history.

(56) References Cited

U.S. PATENT DOCUMENTS

| | | | |
|---|---|---|---|
| 5,417,052 A | 5/1995 | Bharathan et al. | |
| 6,526,754 B1* | 3/2003 | Bronicki | ............... F01K 23/065 60/671 |
| 9,816,437 B2 | 11/2017 | del Omo | |
| 2008/0127647 A1 | 6/2008 | Leitner | |
| 2014/0165572 A1* | 6/2014 | Pang | ......................... F01K 3/12 60/736 |
| 2014/0223906 A1* | 8/2014 | Gee | ........................... F01K 3/24 60/641.15 |

(Continued)

FOREIGN PATENT DOCUMENTS

DE      102013016077 A1    4/2015

OTHER PUBLICATIONS

International Search Report corresponding to PCT/2021/017275, dated Apr. 23, 2021, 2 pages.

(Continued)

*Primary Examiner* — Ngoc T Nguyen
(74) *Attorney, Agent, or Firm* — Schmidt Patent Law, Inc.

(57) ABSTRACT

The invention relates generally to methods and apparatus for integration of renewable and conventional energy to enhance electric reliability and reduce fuel consumption and emissions via thermal energy storage.

20 Claims, 4 Drawing Sheets

(56) References Cited

U.S. PATENT DOCUMENTS

2018/0245485 A1* 8/2018 Conlon .................. F22B 1/006

OTHER PUBLICATIONS

"Liquid Salt Combined Cycle"—Pintail Power, <https://web.archive.org/web/20200127015547/https://www.pintailpower.com/technology/liquid-salt-combined-cycle/>(PINTAIL Power, LLC) Jan. 27, 2020 (Jan. 27, 2020) entire document, 5 pages.
Research-Article entitled, "Adding Energy Storage to the Combined Cycle", <https://asmedigitalcollection.asme.org/memagazineslect/article/143/1/64/1091995>, (Conlon et al.) Jan. 1, 2021 (01.01.0201) 3 pages.

* cited by examiner

FLEXIBLE INTEGRATION OF STORED HEAT AND ELECTRIC RESOURCES (FISHER)

CROSS REFERENCE TO RELATED APPLICATIONS

This application is a continuation of International Patent Application No. PCT/US21/17275 filed Feb. 9, 2021, which claims benefit of priority to U.S. Provisional Patent Application No. 62/972,278 filed Feb. 10, 2020, U.S. Provisional Patent Application No. 62/986,210 filed Mar. 6, 2020, and U.S. Provisional Patent Application No. 63/043,699 filed Jun. 24, 2020. Each of the patent applications identified in this paragraph is incorporated herein by reference in its entirety.

FIELD OF THE INVENTION

The invention relates generally to methods and apparatus for integration of renewable and conventional energy to enhance electric reliability and reduce fuel consumption and emissions via thermal energy storage.

BACKGROUND

Climate Change has brought forward the need to reduce greenhouse gas emissions via deployment of renewable solar and wind generation resources. Renewable resources are so abundant in some places that after displacing fossil generation, the renewables must also be curtailed. For example, on Apr. 21, 2019, before COVID related load reductions, the California Independent System Operator (CAISO) curtailed almost 32 GWh of solar energy because generation exceeded demand. For both economic and environmental reasons, it is essential to store this otherwise curtailed energy for use when the natural variability of renewable resources demands backup from dispatchable generation. Each day, as solar production begins, the CAISO grid experiences a large and rapid drop in net load that forces combined cycle plants off-line. And as solar production wanes in the late afternoon, these plants must rapidly come back on-line. These two related grid operational issues—over-generation and renewable curtailment, and steep ramps in the load served by CAISO are phenomena that create the now famous "Duck Curve" shown in FIG. 1.

Distributed Energy Resources (DERs) that are electrically connected to distribution systems rather than the bulk transmission system have many favorable attributes. DERs are close to the load and thereby avoid transmission losses. DERs are often installed on the customer side of the electric meter where the price of retail electric energy is several times the price of wholesale electricity, increasing the investment return. DERs have the potential to be configured as micro-grids, that are electrically isolated (often referred to as "islanded") from the main electrical grid. In the event of grid outages, microgrids can dis-connect from the grid and continue serving load, and then re-connect when the main grid is operating.

Operating a microgrid requires the ability to maintain the frequency and voltage within limits in response to changes in load. Fired generation, such as gas turbine or reciprocating engine generator sets use a speed governor that adjusts fuel flow to maintain frequency and a voltage regulator that adjust the field excitation of an alternator to maintain voltage. The mechanical inertia of rotating equipment helps to limit the impact of sudden load changes on frequency, and the electromagnetic inertia of the alternator, transformers and cables helps to limit the impact of large inrush currents due to starting motors. Microgrid capability has been used for decades by facilities with their own fired generation or co-generation.

The load served by a microgrid varies throughout the day as in FIG. 2, which shows hourly customer load variation at the Willits substation in California which is potentially subject to its transmission connection being de-energized to mitigate fire risk. The load is shown for twelve days, each day being representative of a different month during the year. The load averages 10.219 MW, varying from a low of 6.188 MW to a peak of 15.380 MW, and totaling 2943 MWh over the 12 days and is indicative of the challenge of serving load for 96 to 120 hours or more during a transmission outage.

Renewable resources typically lack the capability to form a microgrid. Some grid connected resources, such as rooftop photovoltaic systems cannot operate with an external frequency-controlled voltage source. Many DERs use solid state systems to convert DC power to AC and have limited or no ability to respond to voltage or frequency changes. Some DERS, such as wind turbines with induction generators, do not operate at synchronous speed and are unable to maintain frequency, and in some cases can accelerate voltage collapse leading to an outage.

Firm, dispatchable, resources are needed to provide voltage and frequency support so variable renewable resources can contribute their full capacity when the wind or sun is available, and supply electric power when renewables are unavailable. The firm resource must balance variable end-user load and variable renewable output within its operating limits, including minimum and maximum power. Although batteries are a flexible resource their ability to provide firm capacity is limited by the cost of long-duration storage, the risk that variable resources may be insufficient to recharge, and constraints on rate of charge and state of charge related to safety and lifetime concerns. Gas turbines and reciprocating engines can use multiple fuels including pipeline gas and liquid fuels from on-site storage tanks that can be provide virtually unlimited firming capability. But gas turbines and reciprocating engines have minimum load and emissions constraints that may require curtailment of renewable resources.

SUMMARY

The present invention adds thermal energy storage and a Rankine cycle to a combustion turbine or reciprocating engine (both herein referred to as an "engine") to provide firm capacity, provide low-cost, long-duration storage to avoid renewable curtailment, and reduce fuel consumption when renewables are unavailable. Excess variable renewable energy may power electric heaters to heat the thermal energy system, with the heater power varied to maintain frequency. Voltage may be maintained by an alternator, which may be driven by a gas turbine or reciprocating engine or may be de-coupled using a clutch to operate as a synchronous condenser. The Rankine cycle converts stored thermal energy to electricity and the reciprocating engine or combustion turbine operates, for example, when variable renewable or stored energy resources are insufficient to serve load. Exhaust heat from the engine or gas turbine may be captured and stored in the thermal energy storage system. The system maximizes the use of variable renewable resources and minimizes the use of fuel while providing stable frequency and voltage for long-durations.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. As used in this specification and the appended claims, the singular forms "a," "an," and "the" include plural referents unless the context clearly indicates otherwise.

This specification discloses apparatus, systems, and methods for flexibly integrating thermal energy storage with variable and dispatchable electric resources to reliably supply variable electric loads, maintain voltage frequency, reduce the curtailment of variable renewable resources, reduce fuel consumption and reduce the cost of storage.

This disclosure is illustrative and not limiting. Further modifications will be apparent to one skilled in the art in light of this disclosure and are intended to fall within the scope of the appended claims.

Figure 3:
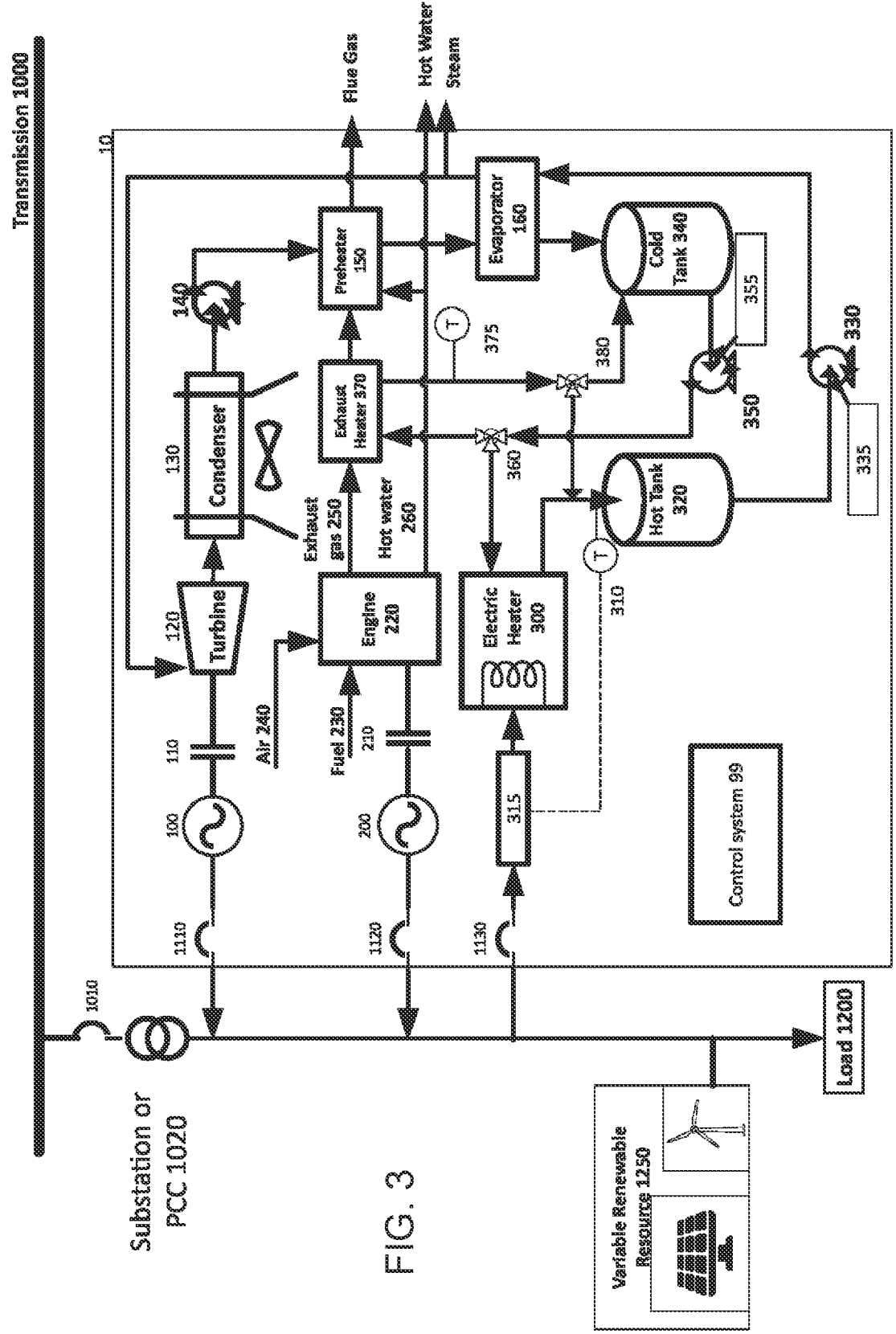
FIG. 3 shows an example system that flexibly integrates thermal and electric resources.

An embodiment of the invention is illustrated in FIG. 3. The FISHER (Flexible Integration of Stored Heat and Electric Resources) system 10 is shown electrically connected on the distribution side of substation 1020, which connects to transmission 1000 via circuit breaker 1010, or at a Point of Common Coupling (PCC) 1020 which connects a facility to the distribution or transmission grid 100 via circuit breakers 1010. During normal conditions, circuit breaker 1010 is closed and power flows from transmission 1000 to serve the load 1200. The load 1200 may vary throughout the day as lights and equipment are turned on and off. Distributed Energy Resources (DERs) may be connected on the load side of substation 1020, such as variable renewable resources 1250 which may comprise solar and wind generation systems.

For example, short-circuit protection at substation 1020 may rely on measurement of current flow from Transmission 1000 through circuit breaker 1010. The DERs may "feed a fault," i.e., provide current to a short circuit, so that the current flowing through circuit breaker 1010 may be insufficient to "trip" a protective relay and open circuit breaker 1010, with the potential for fire and electrocution hazards. The amount of DERs connected to the distribution side of substation 1020 may therefore be limited to assure that protective functions associated with circuit breaker 1010 work properly. One aspect of this invention permits more DERs to be installed by providing additional load via electric heater 300.

Thermal energy is stored in a liquid storage medium that is heated by electric heater 300, or in exhaust heater 370 using heat from the exhaust from engine 220. The storage medium may be a molten salt, an oil, or other suitable heat transfer fluid. Storage medium is circulated by pump 350 from Cold Tank 340 to valve 360 which directs storage medium to electric heater 300, to exhaust heater 370 or to both electric heater 300 and exhaust heater 370. The temperature of storage medium leaving the electric heater 300 is sensed by temperature element 310 which is connected to temperature controller 315 that regulates the power supplied to electric heater 300. The flow rate of storage medium is adjusted by pump driver 355 which adjusts the speed of pump 350 in response to the availability of energy to be stored. Storage medium heated by electric heater 300 enters Hot Tank 320 for storage as thermal energy. Depending on the temperature of the storage medium exiting exhaust heater 370 as sensed by temperature element 375, storage medium may be directed by valve 380 to either Cold Tank 340 or Hot Tank 320. If engine 220 has low exhaust temperature, then valve 380 may be eliminated so storage medium is always directed to Cold Tank 340.

The firm resource is engine 220, which may be a Reciprocating Internal Combustion Engine (RICE) or a combustion turbine, and which combusts fuel 230 with air 240 to produce work that is transmitted via optional clutch 210 to alternator 200 to produce electric power that flows through circuit breaker 1120 to the distribution system to be consumed by load 1200. Hot exhaust 250 flows through Exhaust heater 370 to heat liquid medium and then flows through preheater 150 to heat a Rankine Cycle working fluid, which may be water or an organic such as propane, cyclopentane, carbon dioxide or any other fluid suitable for operating a Rankine Cycle at the available temperature.

Low-pressure working fluid in the liquid phase is pressurized by pump 140 and warmed in preheater 150 by exhaust gas 250 emitted by engine 220. Liquid working fluid then enters evaporator 160 to be evaporated and superheated by heat transfer from hot storage medium. Hot, high-pressure working fluid flows to turbine 120 which produces work that is transmitted through optional clutch 110 to alternator 100 to produce electric power that flows through circuit breaker 1110 to the distribution system to be consumed by load 1200. Low pressure working fluid in the vapor or two-phase state flows to condenser 130 which rejects heat to the environment and discharges liquid working fluid to pump 140. Condenser 130 may use air, water, or both to remove heat from working fluid. Hot storage medium is supplied to evaporator 160 from Hot Tank 320 by pump 330. The flow rate of storage medium is regulated by pump driver 335 in response to the demand for power to be produced by turbine 120.

When circuit breaker 110 is closed, the FISHER system 10 allows load 1200 to be supplied from the lowest cost sources, whether transmission 1000 or some combination of DERS, RICE and Rankine Cycle. Variable Renewable Resources 1250 operate customarily providing energy, as the variable resources allow, to offset load 1200. Excess energy from DERS is directed to storage through circuit breaker 1130. If the cost of electricity from transmission 1000 is favorable, then additional energy is directed into storage.

The Rankine cycle operates on economic signals, including the cost of electricity 1000 or to provide resource adequacy. Likewise, the RICE operates on economic signals, producing power when profitable according to the price of electricity and fuel, and the heat rate (kJ/kWh) at which engine 220 converts fuel energy into electricity.

The FISHER system 10 can control voltage at substation 1020 by using optional clutches 110 and 210 to disconnect alternators 100 and 200 from the turbine 120 and engine 220, respectively. Automatic voltage regulators on the alternators can then vary the excitation to raise or lower the voltage.

Whenever engine 220 is operating, thermal energy is harvested from exhaust gas and stored in either Hot Tank 320 or Cold Tank 340. Efficient engines, such as RICE, may have too low an exhaust 250 temperature to heat storage medium to the desired storage temperature, so the arrangement just described allows heating to occur in two steps, which do not have to be concurrent.

When circuit breaker 1010 is open, the FISHER system 10 enables the distribution side of substation 1020 to function as a microgrid. The Engine 220 and/or Turbine 120 provide firm power via their alternators to maintain frequency and voltage while load and DER generation varies. If there is too much power being generated, the Rankine Cycle can be shut down to conserve stored energy, or the Engine 220 can be shut down to conserve fuel. If a long transmission outage is anticipated, then the engine can operate at full power, along with variable renewable energy, to replenish the energy storage using both electric power in heater 300 and the exhaust heater 370.

One embodiment of a FISHER system 10 is now described where engine 220 is a RICE, such as the 10,200 kW MAN 20V/35/44G which delivers 10.2 MW of electricity at a heat rate of 7769.2 kJ/kWh (46.34% electrical efficiency) with an exhaust gas temperature of 325° C. This exhaust could heat salt from the engine also provides about 17,600 kW of hot water at 101° C. that can supplement preheater 150. A steam Rankine cycle with turbine throttle conditions at 35 bar and 400° C. delivers 5550 kW net at a heat rate of 14400 kJ/kWh (24.7% thermal efficiency). Energy is stored in molten salt at 425° C., by exhaust heater 370 and 10 MW of electric heater 300 and is cooled to 249° C. when producing steam in boiler 150. Assume there are 10 MW of variable renewable resources 1250 available.

Figure 2:
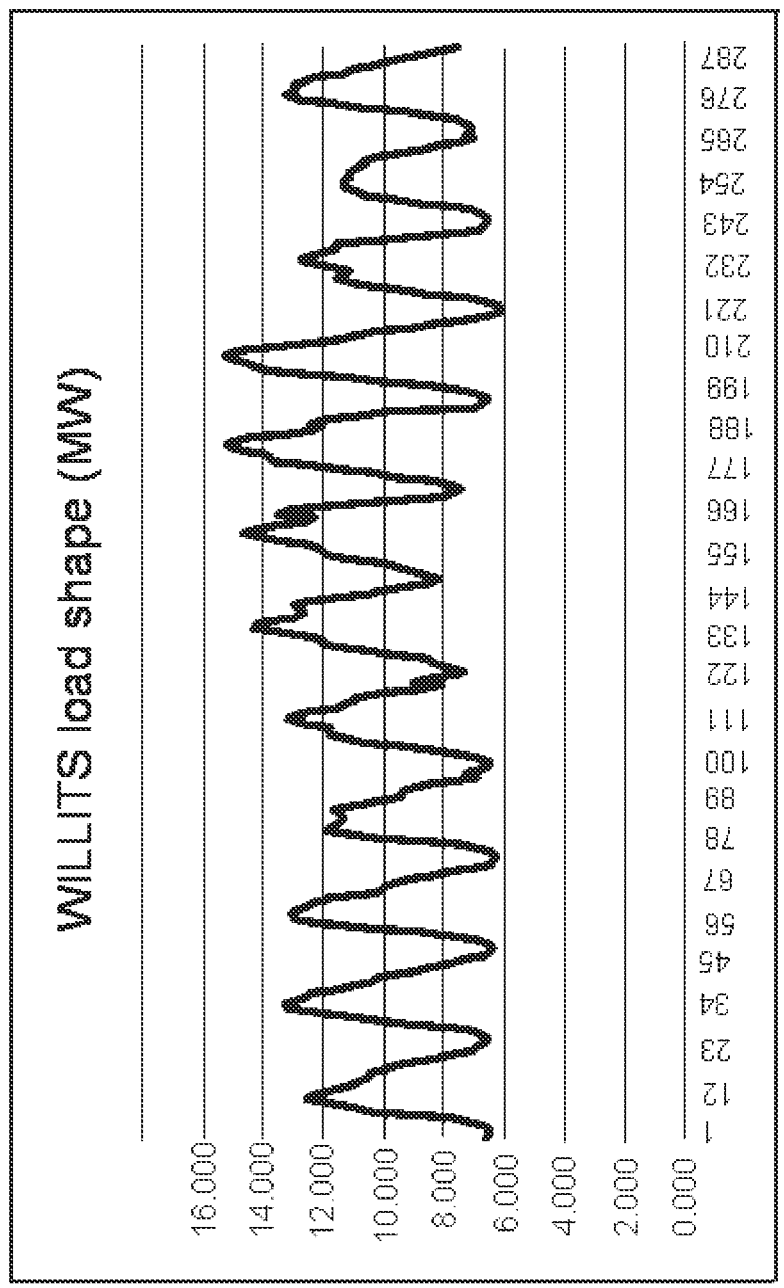
FIG. 2 shows a representative load that might be served by a microgrid.

Consider next the load curve of FIG. 2, which requires 2943 MWh over twelve days. The peak load of 15.3 MW is less than the output of the RICE and Rankine cycle, and often occurs during hours 19 to 21 when solar resources are not available, but diversion of solar resources to storage would provide energy to operate the Rankine Cycle.

Figure 1:
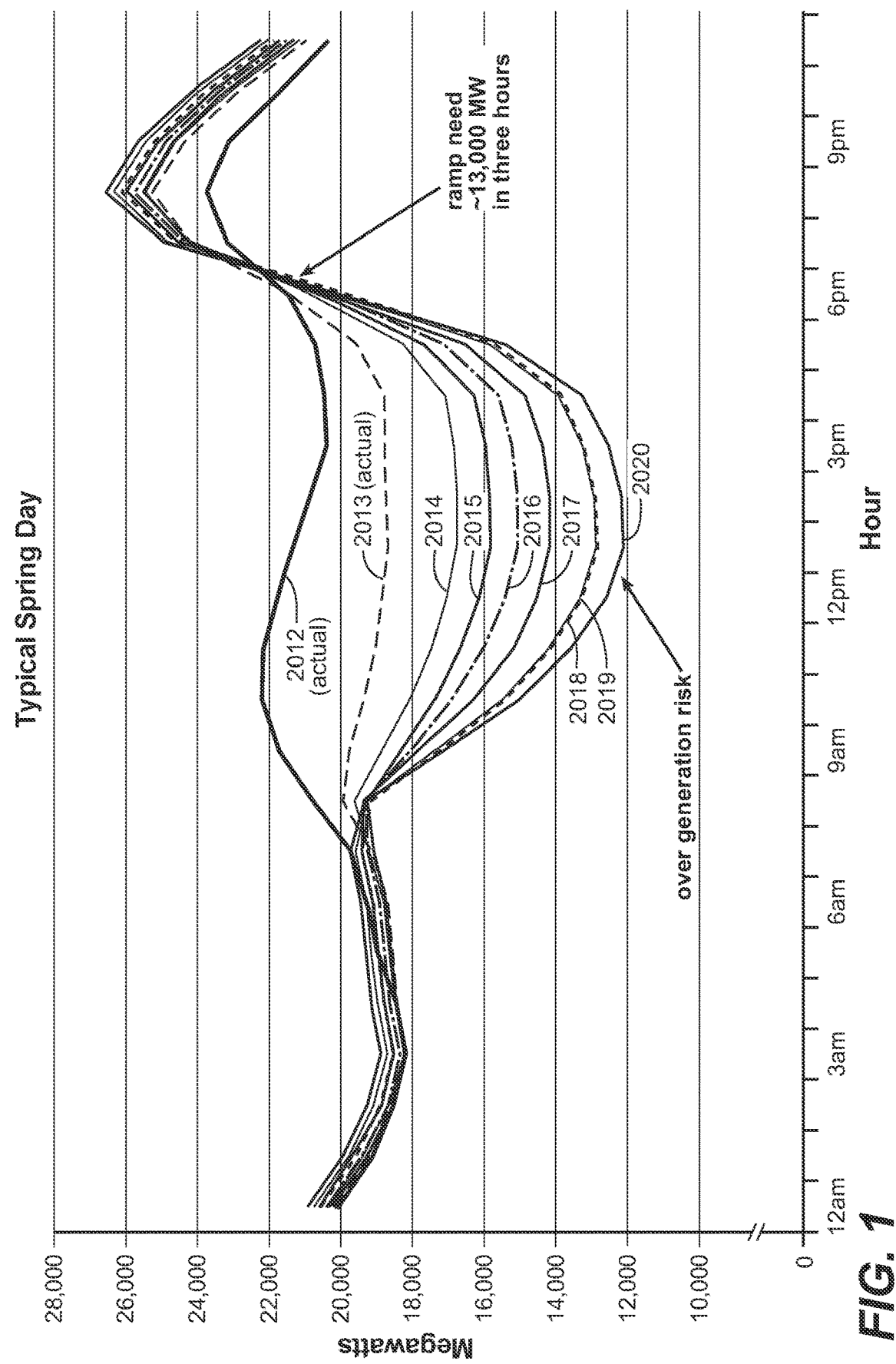
FIG. 1 shows plots of the California Independent System Operator Base Load as a function of time of day—the "Duck" curve.

Next consider the same embodiment of a FISHER system 10 when the transmission grid is connected. As shown in the Duck Curve of FIG. 1, as the sun sets there is need for flexible capacity to meet the ramp and deliver energy for the highest value peaking needs after sunset. The FISHER system 10 time shifts solar energy, whether provided by DERs such as the variable renewable resources 1250 or from the transmission grid. The time-shifted energy is carbon-free, so the effective fuel heat rate would be reduced to 7769.2 kJ/kWh×10.2 MW/(10.2+5.35 MW)=5096 kJ/kWh or 70.6% fuel efficiency. Moreover, over-generation show on the Duck Curve of FIG. 1 results in low energy prices, while the peaking power is at high energy prices, so the time shifting provides arbitrage opportunity.

The size and cost of storage is next considered with respect to the embodiment just described. To produce steam, approximately 67 kg/s (0.038 m$^3$/s) of salt would be required to produce 5550 kW of power in the Rankine cycle. Molten salt costs about $2/kg, so the marginal cost of storage is 67 kg/s×3600 s/h×$2/kg/5550 kJ/s=$87/kWh, less than the cost of batteries. Five hours of storage (26.75 MWh) would require 5 h×3600 s/h×0.038 m$^3$/s=684 m$^3$ (181,000 U.S. gallons) which could be accommodated in a 10 m tall×10 m dia. tank. At the temperature conditions, the salt would be compatible with carbon steel, which is practical and cost-effective.

Alternate embodiments could employ different sized RICE and steam cycles, gas turbines instead of RICE, and Organic Rankine Cycles in place of steam cycles.

The FISHER system 10 could be deployed at customer site to provide micro-grid capability for facilities that have renewable energy such as photovoltaic power generation. Deployment on the customer side of the meter allows the energy to displace retail electricity, which has higher price than wholesale electricity at the substation. In addition, the FISHER system 10 could be used to abate customer demand charges by reducing the customer's maximum power by offsetting load with power from the engine 220 or turbine 120.

The FISHER system 10 may optionally provide useful heat in addition to power, delivering hot water or steam for industrial, process or facility heating and cooling. Hot water 260 can also preheat working fluid to supplement exhaust heating.

The FISHER system 10 can be operated by control system 99 to direct energy flows to optimize system for economic return, for reliability in the face of grid disruption, or for minimum fuel consumption. As inputs, the control system 99 uses customary sensors and instrumentation to measure power flow through and the status of circuit breakers, load, the flow, pressure, and temperature of fuel, working fluid and storage medium at suitable locations within FISHER system 10, ambient conditions that impact performance of the power generation equipment, fuel and electricity tariffs, and may use models of the performance of the electric and thermal resources, and forecasts of weather and load.

Substation 1020 could instead be considered a Point of Common Coupling (PCC) between the distribution grid and a facility having load 1200, variable renewable resources 1250 and a FISHER system 10, with electric revenue metering on the facility side of the PCC, corresponding to a "Behind The Meter" (BTM) installation. When deployed BTM, control system 99 would function to reduce the cost of energy for the facility using an optimal mix of electric energy from the distribution system, renewable electric energy, fuel energy, and stored thermal energy. Some storage capacity in tanks 320 and 340 might be reserved to provide enough thermal energy to maintain facility operations in an outage. The engine 220 or turbine 120 might be dispatched to reduce the net power delivered to the facility at the PCC 1020 in order to reduce demand charges, or in response to time varying electricity tariffs.

If time varying electricity prices are known, for example from a tariff or published in a Day Ahead Market, the control system 99 would use combine a planning horizon with a forecast of time-varying load and time-varying renewable generation to schedule the operation of engine 220, electric heater 300, and turbine 120.

For example, control system 99 determines the net load 1200 (load less variable renewable generation) that must be served by transmission 1000 or FISHER system 10. If there is more variable renewable resource 1250 than load, control system 99 determines if there is more value to exporting the energy across PCC 1020 or heating stored energy for future use. If the load 1200 is greater than the power produced by variable renewable resource 1250, then control system 99 determines whether the cost of electricity from the utility is more or less than the cost of electricity produced from fuel or stored energy, and will turn on engine 220 when profitable, and, while considering the availability of stored energy for demand charge abatement or microgrid operation, will operate turbine 120 when profitable.

Demand charges are calculated for a utility billing cycle based on the time interval with highest power consumption. For many facilities, demand charges are comparable in magnitude to energy charges so reducing net load at the meter or PCC 1020 by self-generation or co-generation is economically attractive. Control system 99 can record the net load during each interval, and dispatch engine 220 or turbine 120, or stop charging by electric heater 320 in order to avoid an increase of net load above the previously recorded maximum for the billing period. It may be economical to operate engine 220 or turbine 120 even if the cost of producing electricity is less than the cost of electricity in order to avoid incurring a higher demand charge.

The cost of electricity from engine 220 is the cost of fuel (e.g., €/MJ) multiplied by the heat rate of engine 220 (MJ/MWh). The cost of electricity from turbine 120 is the cost of stored energy (e.g., €/MJ) multiplied by the Stored Energy rate of the Rankine Cycle. Stored energy derived from exhaust gas 250 has zero cost, as it is derived from heat that would otherwise be wasted. Variable renewable resource 1250 has zero marginal cost, so its contribution to stored energy has zero cost. The utility may supply electricity to electric heater 300 at a time varying cost (€/kWh) and engine 220 may supply electricity to electric heater 300 at the cost defined above. Control system 99 calculates the cost of stored energy based on the relative mix from these sources as determined by measurement of power and the flow rate and temperature change of storage medium. When engine 220 is operating thermal energy is input to the Rankine cycle at the preheater 150 from exhaust gas 250 and hot water 260, both of which can be considered as free energy. Accordingly, only stored energy transferred from storage medium via evaporator 160 is included in calculating the cost of energy from turbine 120. In the above embodiment, the preheat energy reduces the Stored Energy Rate to 11,900 kJ/kWh. By managing the charging to maximize use of zero marginal cost variable renewable resource 1250 or exhaust energy 250, controller 99 can reduce the cost of electricity from turbine 120.

Controller 99 can operate FISHER system 10 to provide ancillary services that may be valuable, when connected or disconnected from a utility. On distribution systems with high quantities of DERs, the voltage may increase and cause higher power consumption. Voltage reduction can help conserve energy on distribution systems. Transmission lines need reactive power to reduce impedance and increase the energy transfer efficiency, so a voltage increase can allow more energy to be delivered. Controller 99 can operate alternators 100 and 200 as synchronous condensers capable of absorbing or producing reactive power to lower or raise voltage by disengaging clutches 110 and/or 210 from turbine 120 and engine 220 respectively.

Controller 99 can operate FISHER system 10 to provide frequency regulation by coordinating the operation of heater controller 315 and pump drive 355. Heater controller 315 may incorporate power electronics, such as Silicon Controlled Rectifiers (SCRs) that rapidly switch the heater on and off. SCRs may switch at zero voltage of the alternating current (AC) or at an arbitrary duty cycle, to provide proportional control of power sent to electric heater 300. This rapid switching can control power over a wide range in proportion to deviation from the frequency reference (50 or 60 Hertz). To maintain temperature of storage medium flowing to Hot Tank 320, controller 99 adjusts the speed of pump 350 via pump drive 355, thereby providing frequency control while charging at a range of power levels In the manner just described the FISHER system 10 can operate as a microgrid connected to a distribution system or Behind the Meter and operate to maximize the integration of DERs. The FISHER system 10 can provide useful heat in addition to electric power, and controller 99 can optimize operation to meet reliability, economic, or fuel consumption objectives as is next described with reference to FIG. 4.

Figure 4:
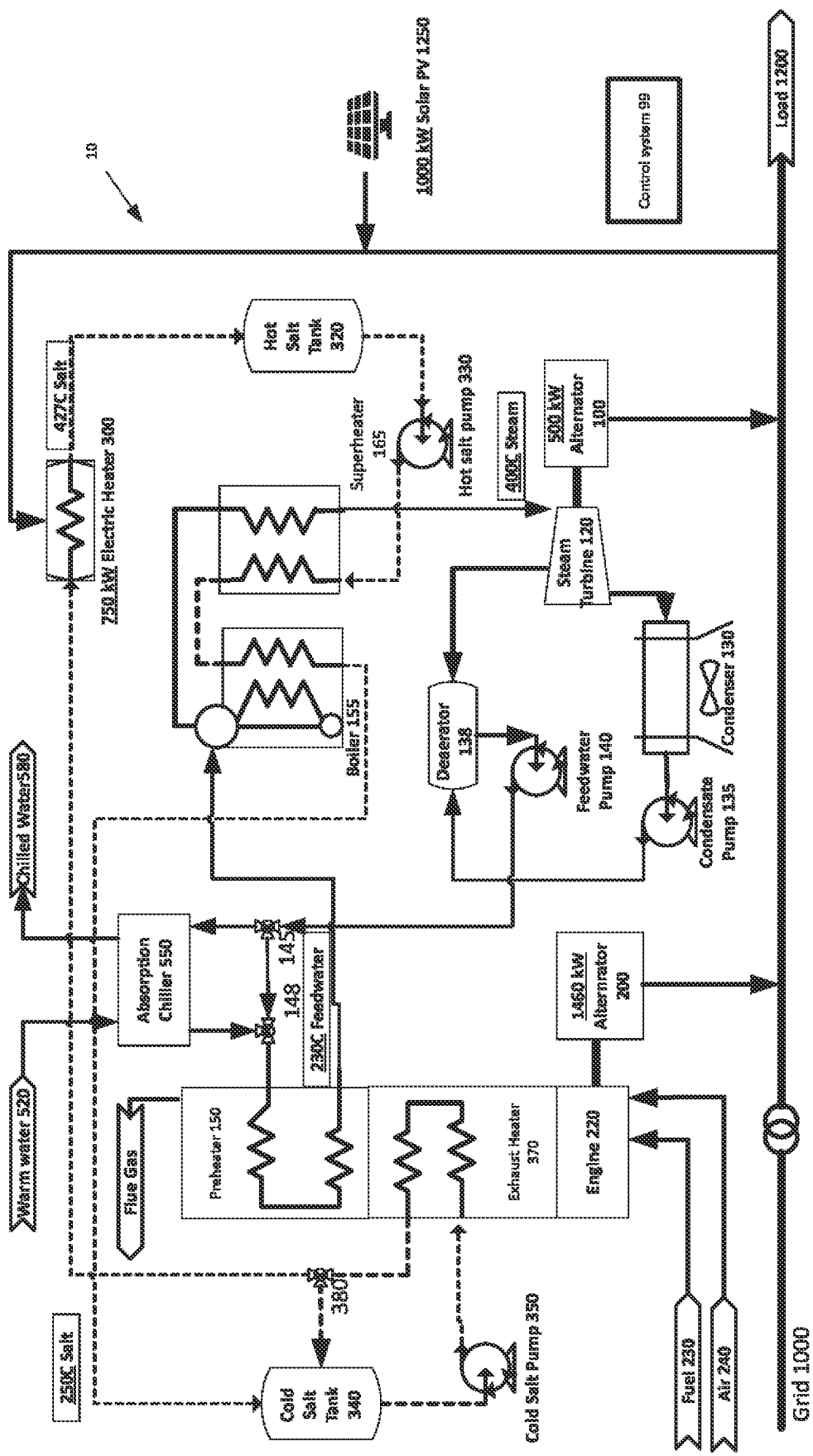
FIG. 4 shows another example system that flexibly integrates thermal and electric resources.

The Fisher system 10 of FIG. 4 is connected to an electrical grid at a Point of Common Coupling 1020 and includes electrical connections to 1460 kiloWatt (kW) alternator 200 driven by engine 220, 500 kW alternator 100 driven by steam turbine 120, 1000 kW solar PV variable renewable resource 1250, 750 kW electric heater 220, and the facility load 1200. Due to efficiency and emissions limits, engine 220 has minimal operating power of 730 kW (50% of full load)

Referring still to FIG. 4, engine 220 may be operated when required due to grid failure, or when economical because the cost of electricity produced by engine 220 is less than the cost of electricity available from grid 1000, or to mitigate load 1200 that might incur demand charges. Fuel 230 and air 240 are combusted in Reciprocating engine 220, with exhaust gas flowing past exhaust heater 370 and preheater 150, and then exiting as flue gas to the ambient. When engine 220 is operating pump 350 circulates molten salt from cold tank 340, to heat salt using exhaust heat. If electric heater 300 is not operating, salt is pumped through exhaust heater 370 and recirculated via valve 380 back to cold tank 340. When economical to store electric energy, salt warmed in exhaust heater 370 is instead directed by valve 380 to electric heater 300, which heats salt to approximately 427° C. for storage in Hot Salt tank 320. The temperature of the hot salt exiting heater 300 may be higher or lower, depending on the design, such as the acceptability of carbon steel in consideration of system cost.

Still referring FIG. 4, the Rankine bottoming cycle may be operated when required due to grid failure, or when economical because the cost of electricity produced by engine 220 is less than the cost of electricity available from grid 1000, or to mitigate load 1200 that might incur demand charges. Water from condenser 130 is transferred by condensate pump 135 to deaerator 138 for removal of oxygen by heating to about 105° C. using steam extracted from steam turbine 120 or from boiler 155. Feedwater pump 140 raises the pressure of de-oxygenated water and sends via valves 145 and 148 to preheater 150 or optionally to absorption chiller 550 to cool warm water 520 and deliver chilled water 580 for refrigeration. Preheater 150 warms the feedwater to about 230° C. which then enters boiler 155. In an arrangement with a multiple effect absorption chiller 550, valves 145 and 148 may be placed on the outlet of preheater 150 instead of the inlet as shown in FIG. 4. Saturate steam is evaporated in boiler 155 at about 40 bar and then further heated to a temperature of about 400° C. by superheater 165 and then flows to steam turbine 120 to produce power. Boiler 155 and superheater 165 may be replaced by a single evaporator 160 which also superheats steam.

Still referring to FIG. 4, heat for the Rankine cycle is derived from thermal energy stored in hot tank 320. Hot salt is transferred from hot tank 320 by Hot salt pump 330, through superheater 165 and then through boiler 155 to transfer heat for superheating steam and evaporating feedwater. Salt leaves the boiler 155 at a temperature of about 250° C. and is directed to cold salt tank 340.

Still referring to FIG. 4, during grid-connected operation of FISHER system 10 control system 99 controls operation of engine 220, steam turbine 120, and heater 300 depending on the load 1200, availability of variable renewable electricity 1250, and the cost of electricity from engine 220 based on fuel cost and fuel efficiency and steam turbine 120 based on cost stored energy and thermal efficiency, and the cost of electricity from grid 1000, which vary with time or according to usage rate. When the cost of grid electricity is less than the cost of producing electricity by engine 220, load 1200 is satisfied by electricity from grid 1000 and variable renewable electricity 1250 will be used by electric heater 300 and by load 1200. If the cost of grid electricity is more than the cost of producing energy by engine 220, then engine 220 produces electricity to meet load net of available variable renewable energy 1250; and if the minimum output of engine 220 is more than load 1200 net of available variable renewable energy 1250, excess energy is used by heater 300; and if the load, net of available variable renewable energy is greater than the output of engine 220, then steam turbine 120 is operated to produce additional power.

Still referring to FIG. 4, during grid disconnected operation of FISHER system 10, control system 99 attempts to operate engine 220 at minimum load, using available variable renewable energy 1250 to reduce net load. If net load is less than the minimum operating point of engine 220, excess electricity is directed to heater 300. If net load is greater than the minimum, the steam turbine 120 is operated to provide fast load following capability with engine 220.

This disclosure is illustrative and not limiting. Further modifications will be apparent to one skilled in the art in light of this disclosure and are intended to fall within the scope of the appended claims.

What is claimed is:

1. A combined cycle power plant comprising:
   an engine that combusts a fuel with air to produce mechanical power and exhaust gas, the engine configured to provide the mechanical power to drive a first generator to produce electricity;
   an electric heater;
   a thermal energy storage system configured to capture and store heat from the exhaust gas from the engine and to capture and store heat from the electric heater; and
   a Rankine cycle comprising:
      a turbine generator configured to expand a gaseous working fluid across a turbine to generate electricity;
      a condenser arranged to condense gaseous working fluid exhaust from the turbine to provide liquid working fluid; and
      an evaporator configured to vaporize the liquid working fluid with heat from the thermal energy storage system to provide the gaseous working fluid expanded across the turbine.

2. The combined cycle power plant of claim 1, wherein:
   the Rankine cycle comprises a preheater arranged to heat the liquid working fluid with heat from the exhaust gas from the engine; and
   the evaporator is configured to vaporize the heated liquid working fluid with heat from the thermal energy storage system to provide the gaseous working fluid expanded across the turbine.

3. The combined cycle power plant of claim 1, wherein the engine is or comprises a combustion turbine.

4. The combined cycle power plant of claim 1, wherein the engine is or comprises a reciprocating internal combustion engine.

5. The combined cycle power plant of claim 1, wherein the working fluid is water.

6. The combined cycle power plant of claim 1, wherein the working fluid is an organic fluid.

7. The combined cycle power plant of claim 1, wherein the electric heater provides heat at a higher temperature than a highest temperature of the exhaust gas.

8. The combined cycle power plant of claim 1, wherein the thermal energy storage system comprises:
   an exhaust gas heater configured to heat a liquid thermal storage medium to a first temperature with heat from the exhaust gas from the engine;
   a first reservoir configured to receive and store the liquid thermal storage medium heated in the exhaust gas heater and to provide it to the electric heater for further heating to a second temperature greater than the first temperature; and
   a second reservoir configured to receive and store the liquid thermal storage medium further heated in the electric heater and to provide it to the evaporator.

9. The combined cycle power plant of claim 8, wherein the liquid thermal storage medium is a molten salt.

10. The combined cycle power plant of claim 8, wherein the engine is or comprises a reciprocating internal combustion engine.

11. The combined cycle power plant of claim 8, wherein:
    the Rankine cycle comprises a preheater arranged to heat the liquid working fluid with heat from the exhaust gas from the engine; and
    the evaporator is configured to vaporize the heated liquid working fluid with heat from the thermal energy storage system to provide the gaseous working fluid expanded across the turbine.

12. The combined cycle power plant of claim 11, wherein the liquid thermal storage medium is a molten salt.

13. The combined cycle power plant of claim 1, wherein:
    the electric heater provides heat at a higher temperature than a highest temperature of the exhaust gas;
    the Rankine cycle comprises a preheater arranged to heat the liquid working fluid with heat from the exhaust gas from the engine; and
    the evaporator is configured to vaporize the heated liquid working fluid with heat from the thermal energy storage system to provide the gaseous working fluid expanded across the turbine.

14. The combined cycle power plant of claim 13, wherein the engine is or comprises a reciprocating internal combustion engine.

15. A method of operating the combined cycle power plant of claim 1, the method comprising powering the electric heater with electricity generated by the engine, with electricity generated by one or more variable renewable resources, or with electricity provided from an external power grid.

16. The method of claim 15, comprising powering the electric heater with electricity generated by the engine.

17. The method of claim 15, comprising powering the electric heater with electricity generated by one or more variable renewable resources.

18. The method of claim 15, comprising powering the electric heater with electricity provided from an external power grid.

19. The method of claim 15, comprising operating the Rankine cycle while not operating the engine.

20. The method of claim 15, comprising operating the engine while not operating the Rankine cycle.

\* \* \* \* \*